United States Patent
Ohtsubo et al.

Patent Number: 5,404,165
Date of Patent: Apr. 4, 1995

[54] APPARATUS AND METHOD FOR PROCESSING SIGNALS OF AN IMAGING DEVICE

[75] Inventors: Hiroyasu Ohtsubo, Yokohama; Masaru Noda, Kanagawa; Michio Masuda, Yokohama, all of Japan

[73] Assignee: Hitachi, Ltd., Tokyo, Japan

[21] Appl. No.: 58,672

[22] Filed: May 10, 1993

Related U.S. Application Data

[63] Continuation of Ser. No. 611,550, Nov. 13, 1990.

[30] Foreign Application Priority Data

Nov. 14, 1989 [JP] Japan ................... 1-293952

[51] Int. Cl.⁶ .......................................... H04N 5/202
[52] U.S. Cl. ..................... 348/254; 348/674
[58] Field of Search ............... 348/222, 223, 227, 254, 348/255, 258, 674, 675; H04N 5/202

[56] References Cited

U.S. PATENT DOCUMENTS

| | | | |
|---|---|---|---|
| 3,808,358 | 4/1974 | Schneider | 358/29 C |
| 4,608,595 | 8/1986 | Nakayama | 358/29 C |
| 4,982,290 | 1/1991 | Nishi | 358/29 C |
| 5,027,214 | 6/1991 | Fujimori | 358/209 |
| 5,034,804 | 6/1991 | Sasaki | 358/41 |

FOREIGN PATENT DOCUMENTS

36-179889 11/1961 Japan.
45153 9/1988 Japan.

OTHER PUBLICATIONS

A Line Sequential Complete Color Difference Signal Method For Single Chip Color Video Camera, By Kohno, et al., The Institute of TV Engineering of Japan, Technical Report, TEBS 101-1, ED836, pp. 1-6 Feb. 27, 1985.

*Primary Examiner*—Victor R. Kostak
*Assistant Examiner*—Nathan J. Flynn
*Attorney, Agent, or Firm*—Antonelli, Terry, Stout & Kraus

[57] ABSTRACT

An apparatus and method for processing signals of an imaging device comprising a detection circuit for detecting the color temperature of a light source for illuminating an object of which the image is picked up and a circuit for varying γ correction characteristics for chrominance signals, whereby the γ correction characteristics are changed to reduce the gains for low level regions of input signals to γ correction circuits in accordance with the color temperature, thereby enabling the final quantize noise to be reduced.

13 Claims, 5 Drawing Sheets

Ia, Ib, Ic : VARIABLE γ CORRECTION CIRCUITS

APPARATUS AND METHOD FOR PROCESSING SIGNALS OF AN IMAGING DEVICE

This application is a continuation of application Ser. No. 07/611,550, filed on Nov. 13, 1990.

BACKGROUND OF THE INVENTION

This invention relates to imaging devices, and particularly to an apparatus and method for processing signals of an imaging device having a most suitable digital signal processing function for a color video camera or the like.

An example of the digital signal processing for a video camera in association with this invention is described in Japanese Patent Publication Gazette No. 63-45153.

The solid-state imaging devices include various different types, and can be roughly divided into the MOS type and the CCD type. In general, the MOS type image sensor has multiple outputs, and the CCD type image sensor has a single output. From the viewpoint of digital signal processing, the CCD type sensor having a single output needs only one A/D converter, and is thus more advantageous than the MOS type sensor which requires a large number of A/D converters. The CCD type sensor includes various different types, and at present the most common one is the picture element mixture read type CCD sensor which is described in The Institute of Television Engineers of Japan, Technical report, TEBS101-1, ED836, pages 1 to 6. This CCD sensor is different in construction from that disclosed in Japanese Patent Publication Gazette No. 63-45153, but it is able to make digital signal processing using the same system.

The digital signal processing in the video camera using the picture element mixture read type CCD sensor has many problems to be solved, one of which is the quantize bit number problem with the A/D converter.

The A/D converter always converts an input voltage within a certain range into a constant digital value. At this time, since the input analog value is not converted into a digital value in one-to-one correspondence, error occurs. This error enters into the signal component as quantize noise.

It is generally known that the quantize bit number, under which the S/N ratio in the video signal processing is not seriously affected by the quantize noise, is 8 bits in the luminance signal and 6 bits in the chrominance signal at the final output stage of the camera.

In the video camera using the above CCD sensor for the digital signal processing, the following processings are performed for producing the luminance signal and chrominance signal, which processing increases the quantize noise.

For the luminance signal:

Gamma processing: The signal is raised to the power of 1/2.2 for the correction of the 2.2-power characteristic of the Braun tube. For this reason, the gain of the luminance signal of low level is increased, thus emphasizing the quantize noise.

For chrominance signals:

Gamma processing: Same as above.

Matrix: The chrominance signal such as RGB is produced by arithmetic processing of the sensor output signals associated with complementary color filters of magenta (Mg), cyan (Cy), yellow (ye) and green (G). At this time, since the chrominance signals of RGB are produced by subtraction processing, the produced RGB signal has a smaller level than the original signal level. Since the signal component is small, the noise component becomes apparently large so that the S/N ratio is decreased by quantize noise.

White balance: The level of the RGB signal produced by the above matrix is changed by the color temperature of the light source. For correcting this, the gains of the R and B signals are increased or decreased. At this time, since the quantize noise of the chrominance signals which are increased in gain is also emphasized at the same gain, the S/N ratio is decreased.

The quantize noise in the above processings is increased particularly for the chrominance signal. At the final output, in order that the quantize noise level included in the chrominance signal is made equal to that in the case of the 6-bit quantization, it is necessary that the quantize bit number of the A/D converter for converting the output signal from the sensor into a digital signal is selected to be at least about 10 bits. However, at present it is difficult to realize the A/D converter of 10 bits or above for video, and thus it is difficult to digitize the signal processing in the camera.

SUMMARY OF THE INVENTION

It is an object of the present invention to provide an apparatus and method for processing signals of an imaging device wherein the quantize noise in the signal processing side can be reduced and the problem with the A/D converter can be solved.

The above object can be achieved by providing a color temperature detecting circuit for detecting the color temperature of a light source which is illuminating an object to be picked up, gamma γ correction circuits (called variable γ correction circuits) of which the γ characteristics are changed by a control signal fed from the outside, and a γ control circuit for controlling the γ correction characteristics of the variable γ correction circuits in accordance with the detected color temperature information produced from the color temperature detection circuit.

The semiconductor used for the present solid-state imaging device is silicon (Si). The silicon Si has the photoelectric conversion characteristic of a high sensitivity to long wavelengths (red side) but of a low sensitivity to short wavelengths (blue side). To balance the sensitivities to red and blue components, a cyan filter or the like is used to suppress the red component of light incident on the sensor. Excessive reduction of the red component, however, will reduce the brightness sensitivity, and thus there is a limit to the correction for the balance of sensitivities to the red and blue components. Thus, since the filter characteristic is generally determined to increase the sensitivity the red component, the blue signal level is lower than the red signal level. On the other hand, when the color temperature of the light source is changed, the levels of the red and blue signals are changed. FIG. 9 shows the change of the red and blue signals. From FIG. 9 it will be seen that the red signal decreases with the increase of color temperature but increases with the decrease of color temperature, and that the blue signal increases with the increase of color temperature but decreases with the decrease of color temperature.

The γ correction is to reversely correct the 2.2-power characteristic of the Braun tube. In other words, as shown in FIG. 2 by the correction curve 4, the gain is high for the low level region of the input signal (the γ correction curve gradient is steep) but low for the high level region of the input signal (the γ correction curve gradient is gentle).

Therefore, the increase of the quantize noise of the chrominance signal becomes adverse at a low color temperature at which the blue signal originally having a low signal level is further reduced, and when the blue signal is at a low level. In this case, in order to achieve white balance it is necessary to increase the total gain of the blue signal component. As a result, since the quantize noise is also increased at a high gain, the total S/N ratio of the signal is decreased.

When the detected color temperature is a low color temperature at which the level of the blue component is low, the γ control circuit controls the variable γ correction circuits to change the γ characteristic in accordance with the detected color temperature so that the gain for low level is decreased. As a result, at a low temperature at which the quantize noise included in the blue signal increases, the gain for the low level region is decreased, and thus the quantize noise due to the γ characteristic can be suppressed from increasing, and finally the quantize noise increase is prevented. Although the reproduced color is changed by the change of the γ correction characteristics, the change of the reproduced color occurs at a considerably low color temperature and thus the picture quality deterioration is small as compared with the increase of the quantize noise.

Similarly, at a high color temperature at which the red component level is small, the gain of the red signal component is increased for white balance. This results in the increase of the quantize noise included in the red signal. In this case, the variable γ correction circuits are controlled in accordance with the detected color temperature to change the γ characteristics so that the gain of the input red signal is decreased in the low level region.

As a result, the quantize noise can be finally suppressed from increasing.

DESCRIPTION OF THE PREFERRED EMBODIMENTS

Figure 1:
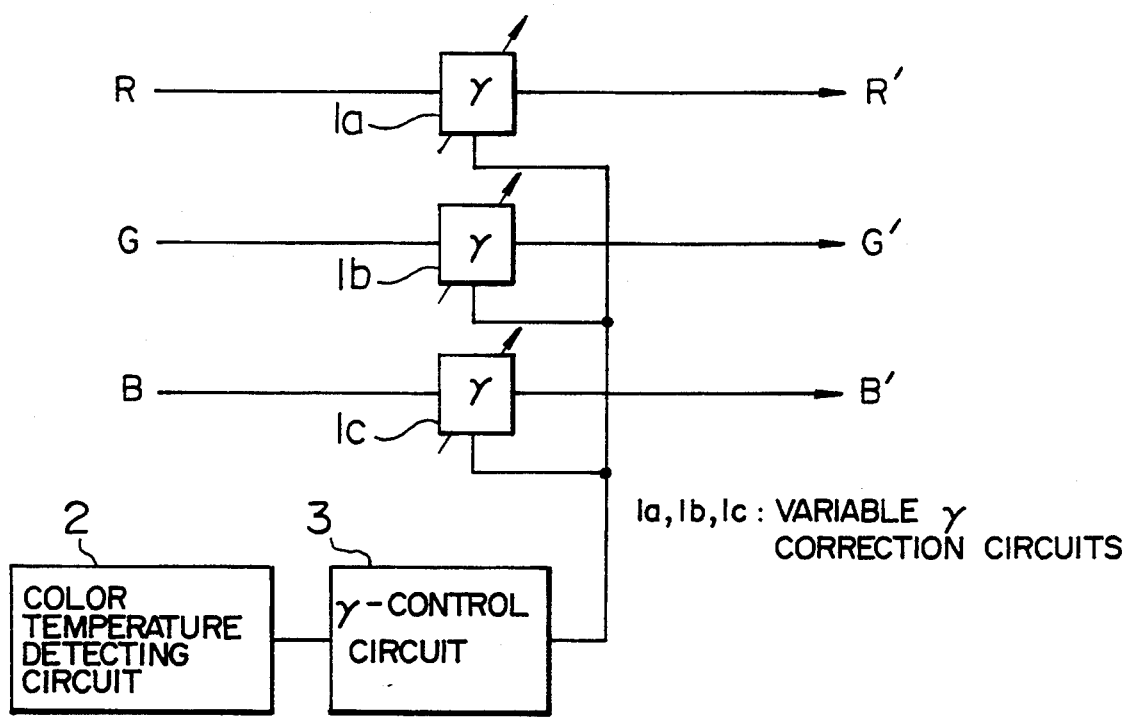
FIG. 1 is a block diagram of one embodiment of an apparatus for processing signals of an imaging device of this invention.

FIG. 1 is a block diagram of the first embodiment of an apparatus for processing signals of an imaging device of the invention. This embodiment is the basic construction of the invention.

In FIG. 1, there are shown variable γ correction circuits 1a, 1b and 1c of which the γ correction characteristics can be changed, a color temperature detection circuit 2 for detecting a color temperature, and a γ control circuit for controlling the γ correction characteristics.

The operation of this embodiment is as follows.

First, the color temperature detection circuit 2 detects the temperature of a light source illuminating an object from which the image is picked up, and supplies the detected temperature value to the γ control circuit 3. The γ control circuit 3 decides from the supplied detected color temperature value if the present temperature is the low color temperature or high color temperature at which the quantize noise of chrominance signals increases to cause problems (generally the quantize noise of blue signal increases only at low color temperatures as described above). If the detected temperature is in the region in which the quantize noise increases, the γ control circuit controls the variable γ correction circuits 1a, 1b and 1c to change the γ correction characteristics so that the gains of input signals are low in the low level region. The variable γ correction circuits 1a, 1b and 1c make γ correction to the input red (R) signal, green (G) signal and blue (B) signal as set by the γ control circuit. In this case, at the low temperature or the high temperature, the gain of the B signal or R signal is increased for white balance, and thus the quantize noise increases, but the gains at the low level at which the quantize noise increases to cause problems are decreased upon γ correction as described above, so that finally the quantize noise can be prevented from increasing.

Thus, according to this embodiment, it is possible to prevent the quantize noise of chrominance signals from increasing due to the change of the color temperature of the light source, and it is possible to achieve the object of the invention.

Figure 2:
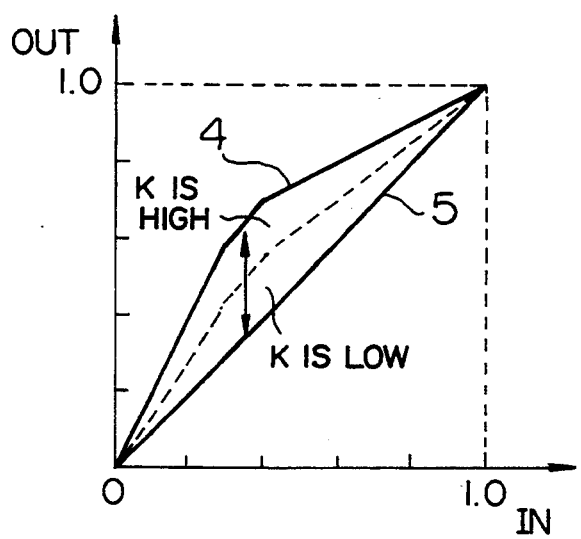
FIG. 2 shows the input/output characteristic of the variable γ correction circuit.

FIG. 2 shows one example of the γ correction characteristics of the variable γ correction circuits in FIG. 1. The γ correction is normally approximate to a polygonal line for simplicity of the circuits. The γ correction characteristics at both input and output are normalized by "1".

In FIG. 2, one example of the normal γ correction of the chrominance signal is shown at 4. As to the characteristic 4, the gain gradient relative to a low-level input is large, thus increasing the amplification degree to the quantize noise. If, now, this input/output characteristic is represented by γ, the input signal by x, and the output signal by γ(x), then the γ characteristic can be expressed as $$y(x) = \{y_1(x) - x\}K + x, \quad (0 \leq K \leq 1) \tag{1}$$

$y_1(x)$ is the result of γ correction based on a certain γ characteristic. Normally, K=1. When K approaches 0, the γ characteristic becomes close to the characteristic 5 shown in FIG. 2, and thus the gain of the input signal can be decreased in the low level region.

Figure 3:
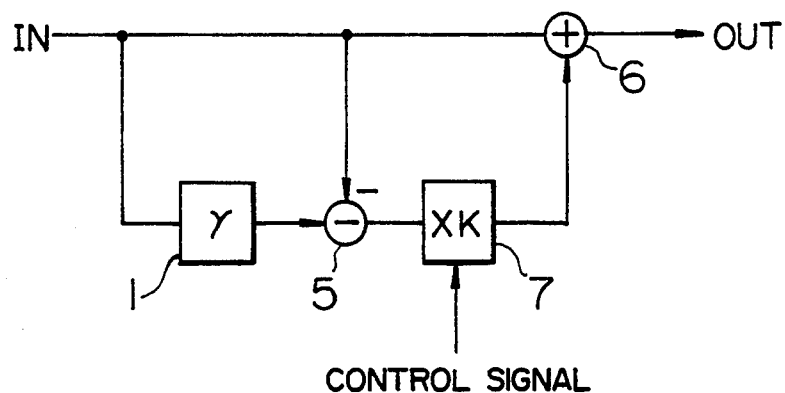
FIGS. 3 and 4 are explanatory diagrams for explaining examples of the arrangement of the variable γ correction circuit.
Figure 4:
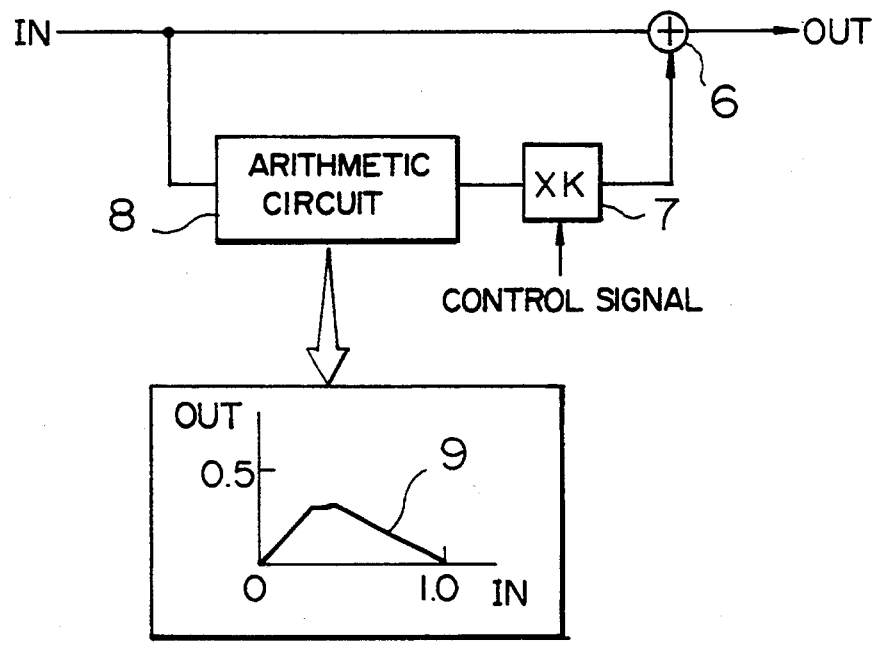

FIGS. 3 and 4 are explanatory diagrams for explaining examples of the arrangement of the variable γ correction circuit in FIG. 1.

In FIG. 3, there are shown a γ correction circuit 1 having a fixed γ characteristic, a subtracting circuit 5, an addition circuit 6, and a coefficient multiplying circuit 7. In this embodiment, the input signal x is first supplied to the γ correction circuit 1, the subtraction circuit 5 and the addition circuit 6. The γ correction circuit 1 applies a γ correction to the input signal x (for example, in accordance with the characteristic 4 shown in FIG. 2) and supplies the output $\gamma_1(x)$ after $\gamma$ correction to the subtraction circuit 5. The subtraction circuit 5 subtracts the signal x from the supplied signal $\gamma_1(x)$, and supplies the obtained signal $\{\gamma_1(x)-x\}$ to the coefficient multiplier 7. The coefficient multiplier multiplies the input signal $\{\gamma_1(x)-x\}$ by K, and supplies a signal $\{\gamma_1(x)-x\}\cdot K$ to the addition circuit 6. The addition circuit 6 adds the signal $\{\gamma_1(x)-x\}\cdot K$ to the supplied signal x, and produces $$\{\gamma_1(x)-x\}\cdot K + x(=\gamma(x))$$

which is equal to the above equation (1).

Thus, the $\gamma$ characteristic can be changed by varying the value of the coefficient K.

An example of the construction shown in FIG. 4 will be mentioned. In FIG. 4, there are shown an arithmetic circuit 8, the coefficient multiplying circuit 7 and the adding circuit 6. In this embodiment, the input signal to the arithmetic circuit 8 is processed according to the characteristic (corresponding to the subtraction of characteristic 5 from characteristic 4 in FIG. 2) shown in FIG. 4 at 9 directly into the $\{\gamma_1(x)-x\}$ signal, and this signal is multiplied by K and then added to the input signal x, thus the expression (1) of $\{\gamma_1(x)-x\}\cdot K + x$ being produced.

Figure 5:
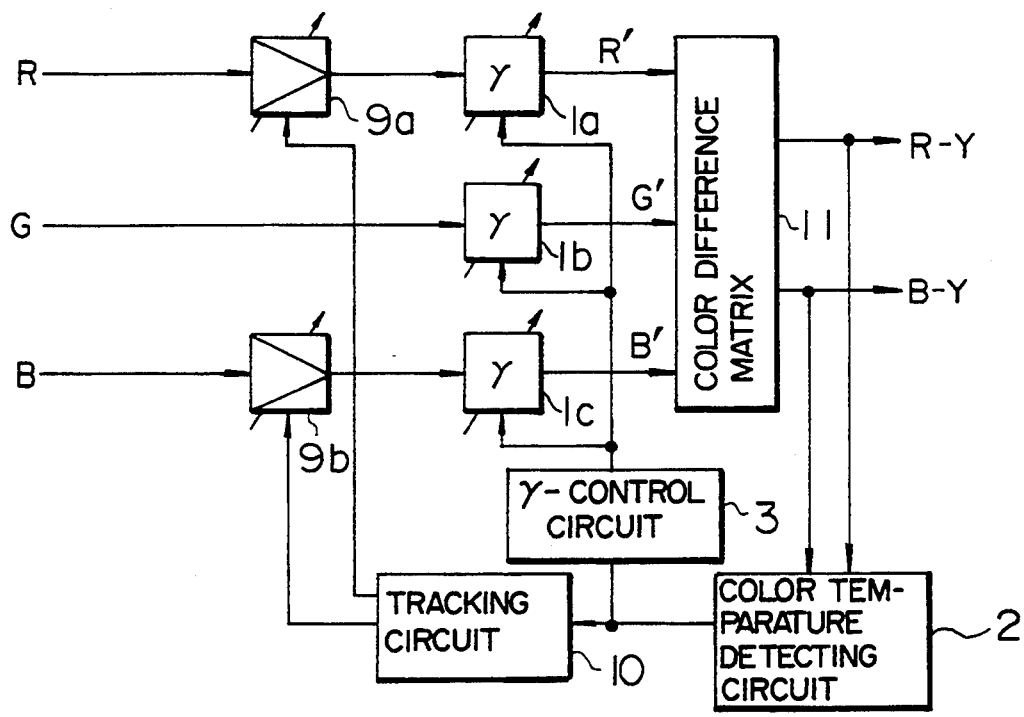
FIG. 5 is a block diagram of a second embodiment of the invention.

FIG. 5 is a block diagram of a second embodiment of the invention. In FIG. 5, there are shown variable gain amplifiers 9a and 9b for white balance, a tracking circuit 10, and a color difference matrix circuit 11. In FIG. 5, like elements corresponding to those in the first embodiment are identified by the same reference numerals.

At present, the color temperature method (system for white balance) is divided roughly into (1) internal light measurement system and (2) external light measurement system. The embodiment in FIG. 5 employs the white balance of the internal light measurement system.

The operation of this embodiment will be described below.

Figure 9:
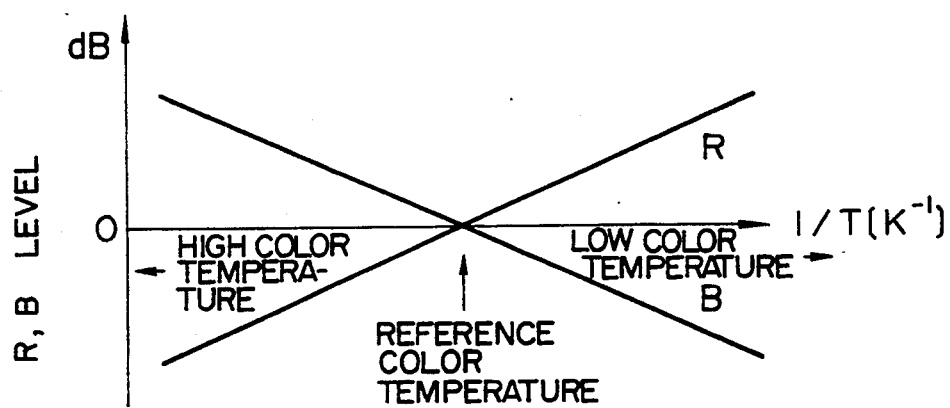
FIG. 9 shows the color temperature dependence characteristics of red and blue signal level.

The tracking circuit 10 is a control circuit for keeping the gain constant when the R, B signals are changed as shown in FIG. 9. This tracking circuit produces R-signal and B-signal gain adjusting signals in accordance with the signal from the color temperature detection circuit 2, and supplies them to the variable gain amplifiers 9a and 9b, respectively. The variable gain amplifiers 9a and 9b are formed of multiplying circuits and multiply the input R-signal and B-signal by the R-signal and B-signal adjusting signals fed from the tracking circuit, respectively. Thus, the variable gain amplifiers are adjusted in their gains, and supply the amplified R-signal and B-signal after gain adjustment to the variable $\gamma$ correction circuits 1a, 1b and 1c. The color difference matrix 11 arithmetically processes the red (R') signal, green (G') signal and Blue (B') signal which are $\gamma$-corrected by the variable $\gamma$ correction circuits 1a, 1b and 1c, and produces difference signals (R-Y) and (B-Y). The arithmetic processing is, in the NTSC system, effected according to $$R-Y=0.7R'-0.59G'-0.11B' \qquad (2)$$

$$B-Y=0.89R'-0.59G'-0.3R' \qquad (3)$$

The color temperature detection circuit 2 arithmetically processes the color difference signals (B-Y) and (R-Y) to produce an average value, and supplies the average value to the $\gamma$ control circuit 3 and the tracking circuit 10. The variable gain amplifiers 9a and 9b, the $\gamma$ correction circuits 1a and 1c, the color difference matrix 11, the color temperature detection circuit 2 and the tracking circuit 10 constitute a so-called control loop, and operate to provide $$R-Y \approx 0$$

$$B-Y \approx 0$$

for an achromatic color portion of white or the like. When the above conditions are satisfied, the control loop is in the balanced state. In the balanced state, the color temperature detection circuit 2 produces a signal corresponding to the color temperature of the light source. Thus, the $\gamma$ control circuit 3 can discriminate the color temperature from the signal supplied from the color temperature detection circuit 2, and thus controls the variable $\gamma$ correction circuits 1a, 1b and 1c in accordance with the discriminated color temperature as in the first embodiment so as to achieve the same effect as in the first embodiment.

Figure 6:
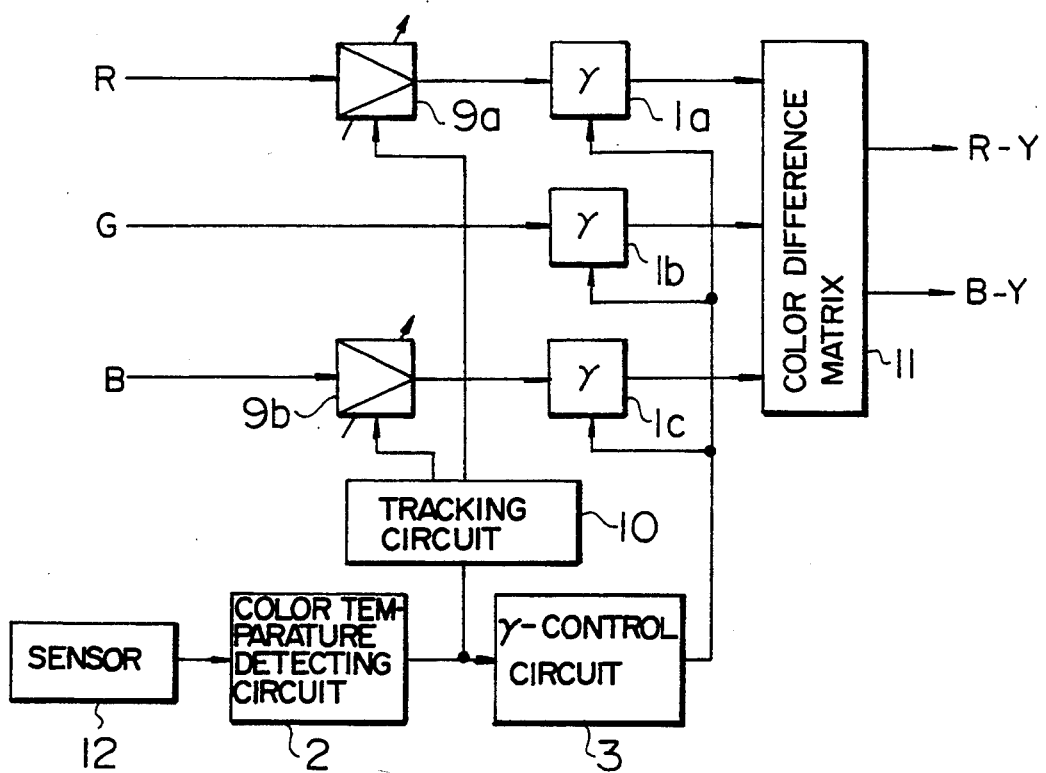
FIG. 6 is a block diagram of a third embodiment of the invention.

FIG. 6 is a block diagram of a third embodiment of the invention. This embodiment employs the white balance of the external light measurement system.

In FIG. 6, there is shown a sensor 12 for measuring the color temperature of the light source (generally a photodiode with a color filter of red or blue). The other portions have the same functions as in the above embodiments. Here, like elements corresponding to those in the above embodiments are identified by the same reference numerals and will not be described.

In this embodiment, the color temperature detection circuit 2 detects the color temperature from the signal (for example, blue level signal, red level signal and so on) from the sensor 12, and supplies the detected signal to the tracking circuit 10 and the $\gamma$ control circuit 3, which then perform white balance and control of $\gamma$ correction characteristics as in the first embodiment. As a result, in this embodiment the quantize noise of chrominance signals can be inhibited from increasing due to the change of color temperature as in the above embodiments.

Figure 7:
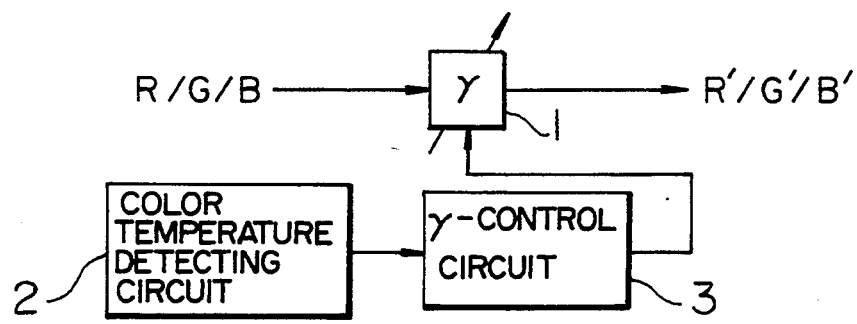
FIG. 7 is a block diagram of a fourth embodiment of the invention.

FIG. 7 is a block diagram of a fourth embodiment of the invention. This embodiment employs one variable $\gamma$ correction circuit for effecting $\gamma$ correction of the R signal, G signal and B signal in a dot sequence. When the variable $\gamma$ correction circuit 1 processes at a satisfactorily high speed, a single variable $\gamma$ correction circuit suffices, resulting in realization of a small circuit scale arrangement.

Figure 8:
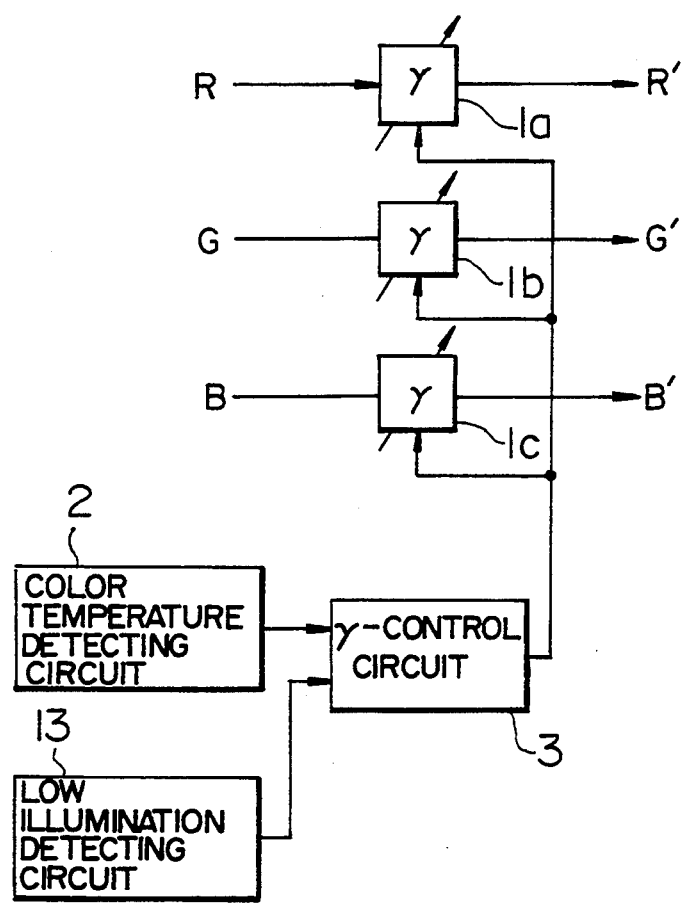
FIG. 8 is a block diagram of a fifth embodiment of the invention.

FIG. 8 is a block diagram of a fifth embodiment of the invention. In FIG. 8, there is shown a low illumination detecting circuit 13. In this embodiment, the low illumination detecting circuit 13 is added to the arrangement of the first embodiment, so that the $\gamma$ correction characteristic can be controlled not only against the high color temperature and low color temperature, but also against low illumination. At a low illumination, an AGC circuit is operative, so that the gain of each color signal is increased. The result is the increase of quantize noise. Thus, the $\gamma$ characteristics are changed to suppress the final quantize noise. The low illumination detecting circuit 13 averages, for example, the luminance signal though not shown. If the average value is lower than a constant value, the low illumination detecting circuit detects that the illumination is low, and supplies this detected signal to the $\gamma$ control circuit 3.

The γ control circuit 3 controls the variable γ correction circuits 1a, 1b and 1c in accordance with the signal fed from the low illumination detecting circuit 13 so that at a low illumination the γ correction characteristics can be changed to reduce the gains for low levels. Thus, according to this embodiment, the quantize noise can be prevented from increasing at low color temperatures or high color temperatures, and also the quantize noise at a low illumination can be similarly prevented from increasing.

All the above embodiments have been described from the viewpoint of the prevention of quantize noise increase on the basis of digital signal processing. However, these embodiments are also able to reduce the normal noise (for example, random noise) in addition to the quantize noise. Thus, by analog processing it is possible to prevent noise from increasing at high color temperatures or low color temperatures.

Moreover, the γ correction circuit for calculation of Eq. (1) can be used for not only color signals but also for the luminance signal. The arrangement itself of the γ correction circuit having the characteristic of Eq. (1) is a noble feature which could not be seen in the prior art, and is not limited to the application to these embodiments.

We claim:

1. An apparatus for processing signals of an imaging device comprising:
   means for detecting a color temperature of a light source illuminating an object from which the image is picked up; and
   means for changing γ correction characteristics relative to color signals of the picked-up image in accordance with an output of said color temperature detecting means and correcting γ characteristics of the color signals based on the changed γ characteristic, whereby quantize noise can be reduced.

2. An apparatus for processing signals of an imaging device according to claim 1, wherein said means for changing γ correction characteristics comprises:
   variable γ correction means for correcting the γ characteristics of said color signals by external control; and
   γ control means for controlling said variable γ correction means in accordance with the output of said color temperature detecting means so that the γ correction characteristics can be changed.

3. An apparatus for processing signals of an imaging device according to claim 2, wherein said variable γ correction means includes means for calculating the following equation $$\gamma(x) = \{\gamma_1(x) - x\}K + x (0 \leq K \leq 1)$$

where $\gamma(x)$ is an output of the variable γ correction means, $\gamma_1(x)$ is a result of a certain γ correction to said color signal of the picked-up image, K is a coefficient, and x is a color signal input to the variable γ correction means,
   and said γ control means includes means for changing said coefficient K.

4. An apparatus for processing signals of an imaging device according to claim 1, wherein said means for changing γ correction characteristics includes means for lowering gains for low level regions of said color signals.

5. An apparatus for processing signals of an imaging device according to claim 4, wherein said means for changing γ correction characteristics includes means for lowering gains for low level regions of said color signals when said color temperature is low or high.

6. An apparatus for processing signals of an imaging device according to claim 4, wherein said means for changing γ correction characteristics includes means for varying gains for low level regions of said color signal.

7. An apparatus for processing signals of an imaging device according to claim 1, wherein said means for changing γ correction characteristics is formed of digital signal processing means.

8. A method for processing signals of an imaging device comprising the steps of:
   detecting a color temperature of a light source for illuminating an object from which the image is picked up; and
   changing γ correction characteristics relative to color signals of the picked-up image on the basis of the detected result of said color temperature and correcting γ characteristics of the color signals based on the changed γ characteristics, whereby quantize noise included in said chrominance signals can be reduced.

9. A method for processing signals of an imaging device according to claim 1, wherein said step of changing γ correction includes a step of reducing gains for low level regions of said color signals.

10. A method for processing signals of an imaging device comprising the steps of:
    detecting an illumination of an object and a color temperature of a light source for illuminating said object from which an image is picked up; and
    changing γ correction for color signals of the picked-up image on the basis of the detected results of said color temperature and said illumination and correcting γ characteristics of the color signals based on the changed γ characteristics, whereby quantize noise included in said color signals can be reduced.

11. A method for processing signals of an imaging device according to claim 10, wherein said step for changing γ correction includes a step for reducing gains for low level regions of said color signals.

12. An apparatus for processing signals of an imaging device according to claim 1, further comprising:
    means for detecting a low illumination of said image, and wherein said means for changing γ correction characteristics comprises:
    variable γ correction means for said color signals the γ correction characteristics of which can be changed by external control; and
    γ control means for changing γ correction characteristics of said variable γ correction means in accordance with said output of said color temperature detecting means and an output of said low illumination detecting means.

13. An apparatus for processing signals of an imaging device according to claim 6, wherein said means for lowering gains operates when said color temperature is lower than a first predetermined value or when said color temperature is higher than a second predetermined value or when said low illumination detecting means detects a lower level of said illumination than a predetermined value.

* * * * *